(12) United States Patent
Martin (10) Patent No.: US 9,980,317 B2
(45) Date of Patent: May 22, 2018

(54) PROTOCOL STACK FOR A MULTI-WAVEFORM AD HOC NETWORK

(75) Inventor: Beatrice Martin, Gennevilliers (FR)

(73) Assignee: THALES, Courbevoie (FR)

(\*) Notice: Subject to any disclaimer, the term of this patent is extended or adjusted under 35 U.S.C. 154(b) by 964 days.

(21) Appl. No.: 13/699,600

(22) PCT Filed: May 19, 2011

(86) PCT No.: PCT/EP2011/058202
§ 371 (c)(1),
(2), (4) Date: Jan. 25, 2013

(87) PCT Pub. No.: WO2011/144712
PCT Pub. Date: Nov. 24, 2011

(65) Prior Publication Data
US 2013/0201876 A1    Aug. 8, 2013

(30) Foreign Application Priority Data

May 21, 2010    (FR) ..................................... 10 02156

(51) Int. Cl.
*H04W 84/18* (2009.01)
*H04W 40/24* (2009.01)

(52) U.S. Cl.
CPC ............ *H04W 84/18* (2013.01); *H04W 40/24* (2013.01)

(58) Field of Classification Search
None
See application file for complete search history.

(56) References Cited

U.S. PATENT DOCUMENTS

2004/0131025 A1\*    7/2004    Dohler ................ H04B 7/2606
                                                          370/328
2005/0141706 A1\*    6/2005    Regli .................... H04L 9/0836
                                                          380/44

(Continued)

FOREIGN PATENT DOCUMENTS

EP    1289197 A1 \*    3/2003

OTHER PUBLICATIONS

Tuna Guven, et al., "A Multi-Layer Approach for Seamless Handoff in Ad Hoc Networks with Wireless Heterogenity", IEEE 2009 Military Communications Conference, Oct. 18, 2009, pp. 1-7, IEEE, Piscataway, NJ, USA, XP031609534.

*Primary Examiner* — Christopher Crutchfield
*Assistant Examiner* — Tito Pham
(74) *Attorney, Agent, or Firm* — Baker & Hostetler LLP (57) ABSTRACT

A protocol stack for an ad hoc type network comprises existing modules from third generation 3GPP architectures, a radio access plane, a mobility management module and a radio resource control module, said ad hoc type network being able to be organized into several groups—or clusters, a group corresponding to a grouping of radio resources for a given coverage area, and: a routing module arranged between the management module and the radio resource control module; a part of the mobility management being managed in the access plane in order to manage transfers, or handovers, between the groups, in the case of a network that is organized into groups of users or "clusterized"; the module manages handover decisions and radio resource management; said protocol stack additionally comprising, an L2RTP layer suitable for processing the radio-level regenerative relaying at the level of a data packet; a security plane for isolating security functions.

7 Claims, 4 Drawing Sheets

(56) References Cited

U.S. PATENT DOCUMENTS

| | | | |
|---|---|---|---|
| 2007/0109989 A1* | 5/2007 | Nakagawa | H04W 84/20 370/328 |
| 2009/0103445 A1* | 4/2009 | Sammour et al. | 370/252 |
| 2009/0109937 A1* | 4/2009 | Cave et al. | 370/336 |
| 2010/0197277 A1* | 8/2010 | Jung et al. | 455/411 |
| 2011/0149757 A1* | 6/2011 | Hu et al. | 370/252 |
| 2013/0342368 A1* | 12/2013 | Nathanson | G07C 5/008 340/903 |

* cited by examiner

PROTOCOL STACK FOR A MULTI-WAVEFORM AD HOC NETWORK

CROSS-REFERENCE TO RELATED APPLICATIONS

This application is a National Stage of International patent application PCT/EP/2011/058202, filed on May 19, 2011, which claims priority to foreign French patent application No. FR 1002156, filed on May 21, 2010, the disclosures of which are incorporated by reference in their entirety.

FIELD OF THE INVENTION

The invention relates to a protocol stack architecture for an ad hoc type infrastructureless network suitable for various radio technologies and various waveforms. The radio equipment of networks in which the protocol stack according to the invention can be applied self-organize in order to communicate with each other by using the present invention.

BACKGROUND

Ad hoc networks are presently evolving with different quality of service, or QoS, levels, from a low data rate to a high data rate, with latency constraints from real time to relaxed latency. The services can be either packet oriented or connection oriented.

One of the main problems is to ensure interoperability in the management of a fleet of mobile terminals, which are made up of equipment from many manufacturers, in networks developed at various levels and for diverse applications. The manufacturers thus provide standardized interfaces.

Another objective is to reduce the costs of development, production and maintenance while retaining a certain degree of confidentiality over the entire content of the end product.

Architectures exist for civilian world cellular networks, in which the radio links can be reconfigured online. For example, cellular systems can be cited. Unfortunately, these architectures are created for networks with a centralized access point (communications with infrastructures) and do not incorporate the aspect of a network without a central access point, or ad hoc network, relaying, security and self-configuration.

There also exist architectures for private mobile communication networks, or PMRs (Private Mobile Radio communications), incorporating a little security and some aspect of an ad hoc type network, but the ad hoc mode is limited to two terminals.

There also exist preliminary architectures for ad hoc networks, for example for the decentralized wireless communications network known by the abbreviation WiFi. These architectures are however not sufficiently complete to support, for example, mobility of terminals, an adaptive transmission mode, a possibility of being reconfigured, remote supervision, the possibility of incorporating various protocols and algorithms, etc. These architectures are "wired" and not flexible.

For the remote supervision aspect, there exist solutions in the 3GPP (3rd Generation Partnership Project) system for supervising infrastructures and cells and coverage areas, but not terminals or ad hoc networks. The architectures of the prior art which are known to the Applicant do not however solve the following points:

relaying, supporting both point-to-point and broadcast services, the ad hoc aspect (routing, self-configuration, etc) in flat or non-hierarchized mode (network without the implementation of specialized roles for the organization of resources or routing in the network) as in clusterized and hierarchized mode, and with supervision.

Some definitions used for the description will be given below:

AHMM is an ad hoc mobility management module,
RSN: a radio routing module,
RRC: a radio resource management module,
L2RTP is a layer or protocol suitable for processing the regenerative relaying at the level of a data packet, at radio level between clusters,
MAC: the Medium Access Control layer.

Hereafter in the description, the words protocol stack and architecture according to the invention are used to refer to the same object.

SUMMARY OF THE INVENTION

The invention relates notably to a protocol stack which is based on the insertion and arrangement of new modules by "two stage" mechanisms for the management of radio resources, a slow process in the radio resource management module RRC, a fast process in the MAC (Medium Access Control) layer, the RRC/RSN and RSN/AHMM couplings and the manner of organizing the cross-layer optimization around these modules which rely on information reported by all the other layers, and the fact that a part of the mobility management module AHMM is brought into the access plane in order to manage mobility between clusters in clusterized solutions; for the management of automatic intercellular transfers, or handovers, is in the RRC module.

For the relaying aspect, the protocol stack according to the invention supports several modes: transparent and regenerative.

The invention relates to a protocol stack for an ad hoc type network comprising existing modules from third generation architectures, or 3GPP, said protocol stack comprising a radio access plane, a management module AHMM and a radio resource control module RRC, said ad hoc type network being able to be organized into several groups or clusters, characterized in that said stack additionally includes the following items:

A routing module RSN arranged between the management module AHMM and the radio resource control module, a part of the mobility management being managed in the access plane in order to manage transfers, or handovers, between the groups, in the case of a network that is organized into groups of users or "clusterized", The RRC module is suitable for managing handover decisions and radio resource management, Said protocol stack additionally comprising an L2RTP layer suitable for processing the radio-level regenerative relaying at the level of a data packet, A security plane for isolating security functions.

The AHMM/RSN/RRC modules are for example combined so as to centralize cross-layer optimization processing by limiting the volume of exchanges of cross-layer information, this assembling action being interfaced by the control plane to all the other layers and functions of the waveform used in the network.

The architecture can additionally include a remote supervision module OAM.

According to a variant embodiment, the architecture includes a local supervision module OAM, at each of the nodes of the ad hoc network.

According to another embodiment, in the radio resource control module, the protocol stack includes a slow process and the medium access control module, or MAC, is suitable for sequencing the access to the physical medium in a real-time manner and for carrying out fast adaptations of the data transmission format among a set of formats supplied by the RRC module, on a frame by frame basis, and in accordance with various types of fluctuations such as source flow variations, discontinuous transmission configuration, quality of service offered by the various relaying paths.

The protocol stack includes, for example, a dynamic reconfiguration step for algorithms of the RSN and RRC layers.

According to one embodiment, the protocol stack includes a step for reconfiguring RRC radio resource management algorithms and a step for reconfiguring the MAC and PHY layers.

BRIEF DESCRIPTION OF THE DRAWINGS

Other features of advantages of the device according to the invention will become clearer upon reading the description of an example embodiment given by way of illustration and in a non-limiting manner, accompanied by drawings which represent.

DETAILED DESCRIPTION

The scope of the architecture proposed concerns, notably, the access plane, i.e. the features between on the one hand the radiofrequency RF and on the other hand the application and internetwork routing.

In summary, the protocol stack according to the invention is based on a framework inherited from cellular systems, such as third generation 3GPP systems, in which a routing module RSN is inserted between the mobility management AHMM and the radio resource control RRC. In the present invention, a part of the mobility management is introduced in the access plane in order to manage "radio link transfers", or "handovers", between coverage areas, and, in the case of a "clusterized" solution, between clusters. The protocol stack is compatible with several routing methods: flat, clusterized, and with the possibility of a transition from one mode to the other during operation.

An L2RTP layer has been added to process radio-level regenerative relaying (for regeneration at packet level). The protocol stack also includes an option of remote supervision with an OAM module. For security, a parallel plane has been introduced. The purpose of this plane is notably to isolate the security functions into a board managing security such as a board marketed under the INFOSEC brand and which allows this security plane to control all the activation/configuration/inhibition layers.

A local supervision is also possible with the OAM module, and this is compatible with software radio SDR.

Figure 1:
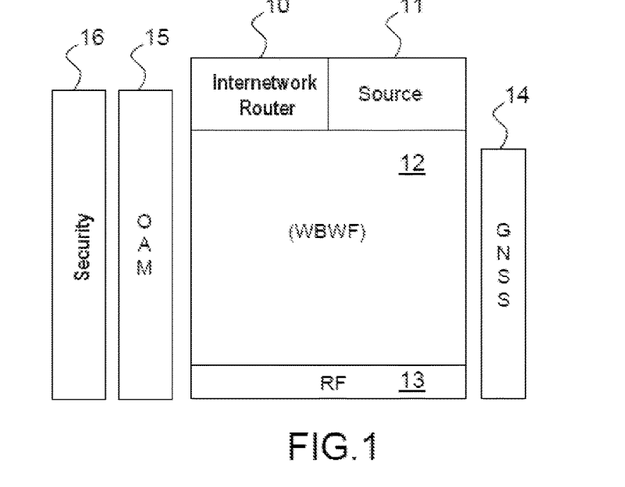
FIG. 1, a block diagram of the applicative scope of the architecture according to the invention, FIG. 2, the Quality of Service, or QoS, architecture according to the invention, FIG. 3, a complete block diagram of the architecture according to the invention, FIG. 4, an example of a protocol in the user plane, FIG. 5, the transitions of roles or states taken by a node, FIG. 6, an example for the simplified cross-layer exchanges from a network that is flat, non-hierarchized and reconfigured dynamically when in operation, into a structure with hierarchical routing, and FIG. 7, an example implementation of the method and protocol stack according to the invention.

FIG. 1 schematically shows an example of an architecture according to the invention charged with protocols which are related to the transmission medium, i.e. the radio interface, such that it manages all the features of the physical layer when placed in ad hoc network mode. The protocol stack according to the invention is notably designed so as to be interconnected with other networks in order to establish an IP-compatible network through the notion of standardized open interfaces.

By using an analogy with the civilian language of 2G/3G cellular networks, the domain of the architecture according to the invention is the "Access Stratum" domain, i.e. the physical access layers, as illustrated in FIG. 1. The interfaces with "non-access stratum", or NAS, functional layers are standardized by classes of services, or CoS.

At the top level, the architecture according to the invention interfaces with traffic sources 11, such as IP Internet traffic or non-IP traffic, and internetwork routing 10. The architecture according to the invention takes charge of multi-hop radio path routing within a given radio coverage. At the bottom level, the architecture according to the invention or protocol stack interfaces with the radiofrequency module RF through an RF converter 13, i.e. modulated symbol level.

The architecture according to invention provides facilities to encrypt data in addition to the encryption procedure applied at application level. This notably provides protection of the intra-network signaling protocol. Security protocols, protection of data and of the physical signal are also supported.

An interface with maintenance operations OAM, 15, provides for local and/or remote supervision.

Optionally, the architecture or protocol stack according to the invention can be interfaced with a satellite system geolocation and navigation receiver, known by the abbreviation "GNSS", for synchronization and location functions.

Figure 2:
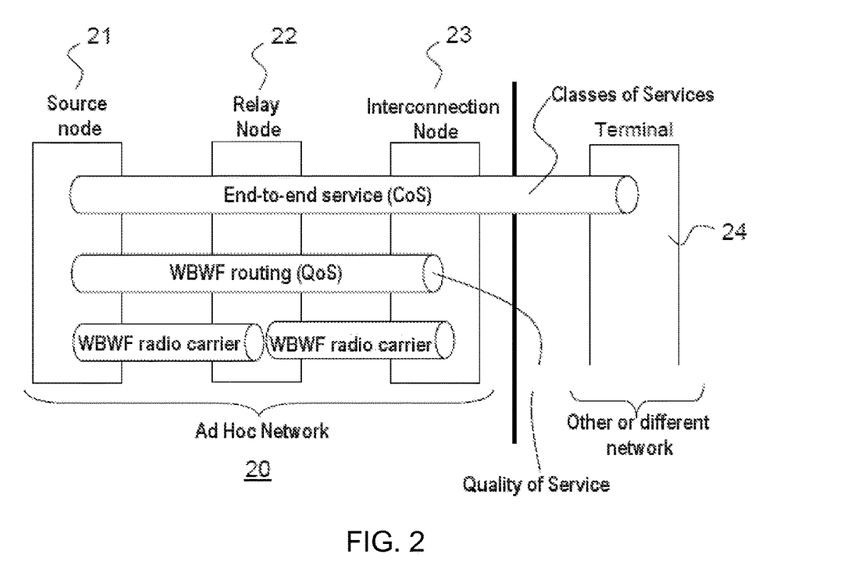

FIG. 2 schematically shows the Quality of Service part provided by the architecture according to the invention at the level of an ad hoc network 20 comprising, for example, a source node 21, a relay node 22, an interconnection node 23 and a terminal 24 able to belong to the same network or to a different network. The end-to-end Quality of Service is managed at the level of the NAS functional layer with the support of the access layer. For example, for IP services, collaboration between access layers and NAS layers is achieved using the field allowing the attribution of service levels to the network traffic or DSCP (Differentiated Services Code Point) for the classes of services CoS required.

Within an access layer, two levels of quality of service QoS are defined: at radio link level between two neighboring nodes and at routing level between border nodes (borders between networks).

A class of service CoS is converted into quality of service QoS of the radio interface according to the invention during the negotiation phase when the service is set up. The Quality of Service of the architecture according to the invention is characterized by: a minimum/maximum data rate, a maximum transfer delay, jitter delay variation, error rate, priority, maximum number of radio hops, etc. These quality parameters are converted into routing parameters (by the routing algorithm) and transmission parameters (modulation, transmission channel encoding, etc.)

The mechanisms for managing/providing quality of service are known in the prior art and will therefore not be described again.

Protocol Stack

The protocol stack of the architecture according to the invention inherits an Open Systems Interconnection, or OSI, layer structure and is enhanced with a cross-layer optimization approach for managing the ad hoc aspect and security. It also supports the structure of levels of information from 3G standards, i.e. logical channels, transport channels and associated transport format concepts, physical channels and associated transmission formats.

The protocol stack according to the invention is made up of four planes (FIG. 3): a user plane 30, a control plane 31, a management plane 32 and a security plane 33. The user plane follows the OSI rules known to the person skilled in the art while the control, security and management planes carry out the transversal aspect for the cross-layer optimization.

Figure 3:
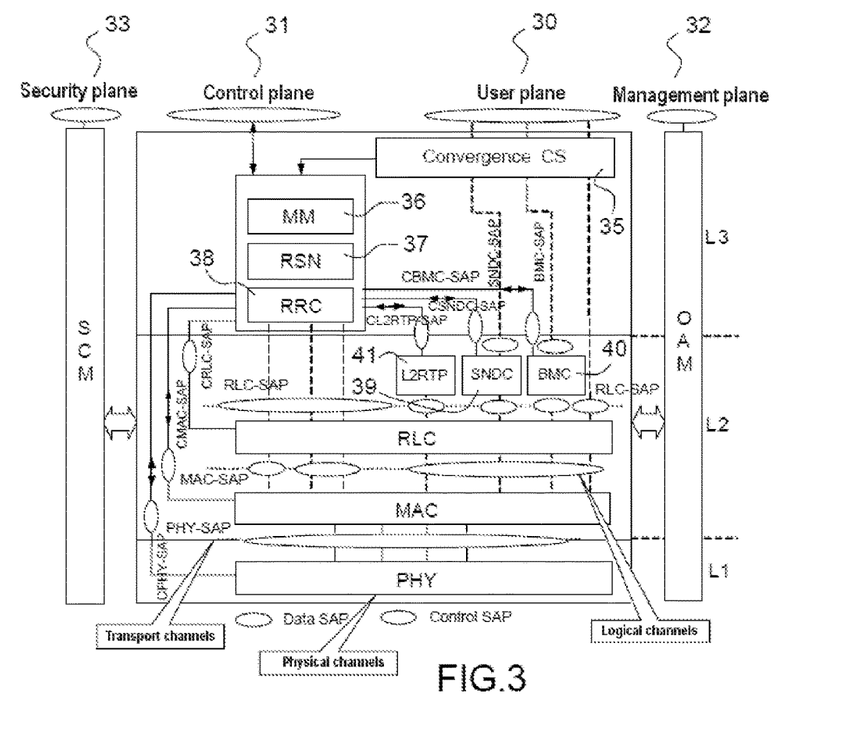

The user plane 30 takes charge of data exchanges (user and signaling traffic) at the radio interface. Communication between the layers is achieved with service primitives through data service access points, or SAPs.

The control plane 31 configures the user plane 30 and notably manages mobility, radio resource allocation, routing and relaying. The cross-layer communication is managed or negotiated through the control access points (control SAPs). The control plane 31 is structured so as to allow cross-layer optimizations known to the person skilled in the art by relying on information reported by the various layers, the control functions being able to be grouped together.

The security plane 33 takes charge of the various security features and this plane is configured according to the security level required for a given use of the radio interface. It secures the protocol layers through the security service access points, or SAPs.

The management plane 32 notably ensures an appropriate configuration and a supervision of the layers. It is compatible with SDR requirements. It accesses the protocol layers via the management access points, or SAPs.

A combining of the AHMM/RSN/RRC modules in the control plane 31 provides for centralizing cross-layer optimization processing actions by limiting the volume of exchanges of cross-layer information, this assembling action being interfaced by the control plane to all the other layers and functions of the waveform.

An example protocol stack according to the invention is illustrated in FIG. 3.

The convergence sub-layer CS, 35, provides the interface with the various types of services and manages the sessions (Internet Protocol IP, connection oriented, connectionless short messages, etc.). It makes use of the mobility management services to access a radio coverage area. The mobility management module AHMM, 36, takes charge of supporting mobility in the radio areas covered and supporting mechanisms such as affiliation and in the case of clustering, inter-cluster mobility (handovers) and paging in the area covered. In the case of hierarchical clustering, AHMM manages the location areas (groups of areas covered by the radio links). AHMM is under control of the security plane for authenticating participating entities. AHMM calls databases distributed among the various items of equipment of the ad hoc network.

AHMM makes use of the RSN entity, 37, to access the routes of a coverage area. RSN performs the ad hoc radio routing in addition to NAS (Non-Access Stratum) routing, i.e. all the functions intervening in the routing process, such as the detection of the presence of radio equipment, the construction of a list of neighbors and routes, route selection, etc. It can support both reactive and proactive protocols. In the case of a clustered approach, the RSN module takes charge of the management of a cluster (creation, modification, deletion of radio equipment declared in a cluster). RSN makes use of the radio resource control RRC, 38, to adapt routing decisions to radio conditions and to activate in an effective manner a radio link associated with a virtual route.

RRC controls the configuration for accesses to radio resources located at a node in the case of a flat, non-hierarchized network. It is RRC which decides the value of the frequency of the carrier to be used and the set of transmission modes (encoding scheme, ARQ protection, etc) which can satisfy the quality of service QoS request. This includes the multiple input multiple output, or MIMO, configuration when MIMO is activated. In the case of clustering, the instance of the RRC protocol located in the equipment designated as the cluster head controls the radio resources for the nodes located in its coverage area and informs them of the parameters allocated to them. The cluster head is capable of collaborating with adjacent cluster heads. RRC manages the state of the radio link. To this end, RRC collects and filters measurements from lower layers as well measurements returned by participating entities for the RRC instance located in the cluster head, in the case of clustering; consequently, RRC reconfigures the radio resource. RRC also manages load balancing between the radio links, and the control of the parameters for long term power (slow frequency of modification) and for short term power (fast power control parameter modification). RRC implements algorithms that depend on the multiple access scheme. In the case of DS-CDMA encoding mode, it manages macro-diversity (links involved in cooperative routing). In the case of TDMA (Time Division Multiple Access) encoding and/or OFDMA (Orthogonal Frequency Division Multiple Access) encoding, RRC manages sub-network synchronization and the protocol for adjusting the timing advance of transmissions.

AHMM, RRC and RSN belong to the control plane 31. Their signaling PDUs (Protocol Data Units) are transmitted to the radio link control layer RLC in the user plane for transmission to their peer entities. AHMM, RRC and RSN are grouped together and perform cross-layer optimizations by relying on information coming from the various other layers and received in the control plane.

The Sub-Network Dependent Convergence (SNDC) layer 39 adapts the IP traffic flow to the radio interface. The convergence layer supports both IPv4 Internet protocol flows and IPv6 Internet protocol flows. Header compression can be activated and several protocols known to the person skilled in the art can be used. One instance of SNDC can be created for each traffic flow.

Broadcast/multicast control 40 of the broadcast control layer, or BMC (Broadcast/Multicast Control), adapts broadcasting/multicasting data flows to the coverage area. It also manages service notification to the recipients, which notification allows them to activate the reception of a desired service.

The L2RTP layer protocol, 41, provides tunnels for regenerative relaying where the transmission format is not necessarily identical between reception and re-transmission. Since the routing can be multipath routing (several paths in parallel), an information block may be duplicated at a relaying node. L2RTP manages mechanisms to avoid unnecessary duplications.

The sub-network dependent convergence layer SNDC, the L2RTP module and BMC belong to the user plane 30.

All the layers which have been described make use of the radio link control layer RLC to transmit their PDUs to their peer entity.

RLC generates the data transfer (either traffic or signaling) over one radio hop. It manages transfer modes known in the prior art: transparent, acknowledged, unacknowledged. To this end, it implements several processes such as segmentation and reassembly, duplication detection and ARQ error correction. RLC supports link re-establishment in the case of a temporary suspension of a radio link due to loss/recovery or transition into silent mode. RLC can be configured to report transfer error rate to RRC. One RLC instance can be created for each information flow.

The medium access control, or MAC, layer, 50, (FIG. 4), sequences access to the physical medium in a real time manner and makes fast adaptations of the transmission format among the set of formats provided by RRC, on a frame by frame basis and according to various types of fluctuations such as data source rate variations, discontinuous transmission DTX configuration, etc. MAC applies priorities between flows from RLC, 51. The MAC control layer also manages CSMA (Carrier Sense Multiple Access) multiple access mechanisms or random accesses (depending on the type of access that is activated). This same MAC layer executes a monitoring of neighboring signals and reports to RRC (transmits the detection information to RRC which may or may not activate message decoding, for cooperation with route discovery implemented in RSN). The MAC layer can be configured by RRC to report traffic/signaling quality measurements and data volume measurements. The MAC control layer implements timing advance in the case of TDMA and/or OFDMA type access.

In addition to encryption that may be carried out at the traffic source in the NAS, encryption of signaling or of data blocks can be carried out at the MAC/RLC level under the control of the security plane.

Figure 4:
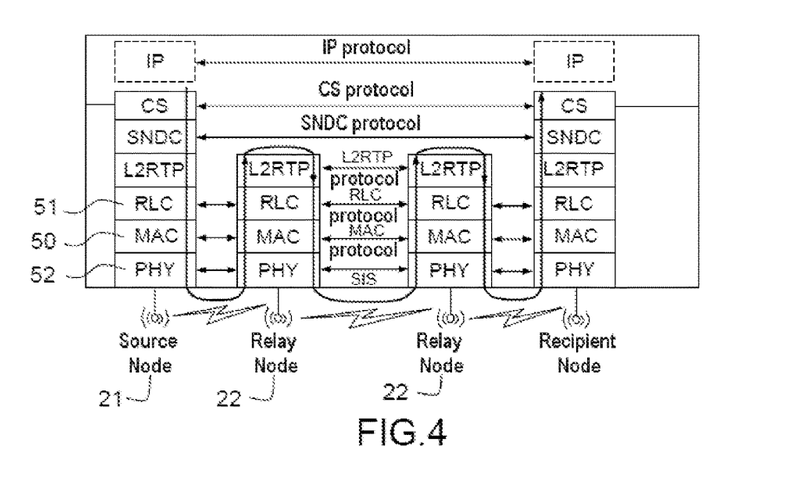

The physical layer PHY, 52, implements signal processing i.e. modulation, channel encoding and interleaving, error detection by error correcting code CRC, processing of retransmissions at the hybrid ARQ physical layer if the latter has been activated, scrambling of bits and symbols. With CDMA multiple access encoding, the physical layer PHY implements spreading and macro-diversity. In the case of CDMA or orthogonal frequency encoding OFDM, the layer PHY implements fast power control and MIMO processing. Protection of the physical signal (TRANSEC) can be implemented in the physical layer PHY or externalized depending on the security architecture required.

Each layer implements a peer-to-peer protocol and the exchange of associated protocol data units PDUs with the peer entity located either at the neighboring node for the lower layers or in the multi-hop recipient node for the upper layers, as illustrated in the user plane in FIG. 4 in the example of regenerative relaying. The protocols and PDUs are potential candidates for standardization for inter-equipment interoperability while decision algorithms that optimize performance of the architecture according to the invention can remain proprietary. The service primitives could be standardized depending on the granularity that will be decided for SDR standardization.

Flat Networks and/or Clustered Networks

The protocol stack according to the invention supports both flat routing, an expression known to the person skilled in the art, and clustered routing. Hierarchical organization is also supported and could, a priori, be reserved for scenarios in which a node becomes a centralized access point of the network for signaling and traffic (e.g. ATH/NLI scenario). Dynamic transition between the flat mode and the cluster and hierarchized mode is ensured by the reconfiguration of RRC and RSN without modifying the behavior of the architecture. An example with the dynamic routing protocol OLSR (Optimized Link State Routing) and the hierarchized protocol HOLSR (Hierarchical OLSR) is given below. It can be noted that the OLSR protocol is compatible and can manage very extensive networks by using a fisheye extension (an established term in the technical field) or by using the hierarchized version, HOLSR.

According to the current topology of the network, i.e. dependent on the number of nodes in a given vicinity or in proximity, the nodes are able to take on several roles, some examples of which are given below.

Member node, i.e. an ordinary node, the RRC instance of which can be executed in two modes:

1—in the absence of a cluster head within the vicinity: autonomous choice of radio resources in collaboration with MAC (flat configuration), 2—in slave mode, i.e. radio resource usage is under the control of the cluster head to which it is attached; RRC implements the protocol messages for resource requests, allocation receipts and execution.

Cluster head: the RRC instance located in the cluster head implements the protocol and the algorithm for the control and allocation of radio resources to the other nodes. This is typically adapted when the density of nodes increases.

Gateway Node: provides the interface between two or more than two clusters (and belongs to these clusters).

Cluster head and gateway node: combination of both roles. This means adopting a hierarchical structure and is typically adapted to scenarios in which a node becomes a centralized access point of the network (e.g. ATH and NLI).

When the nodes switch from one role to another, RRC and RSN are dynamically reconfigured in order that the algorithms and protocols are consequently activated or inhibited. An example is given in FIG. 5.

Figure 5:
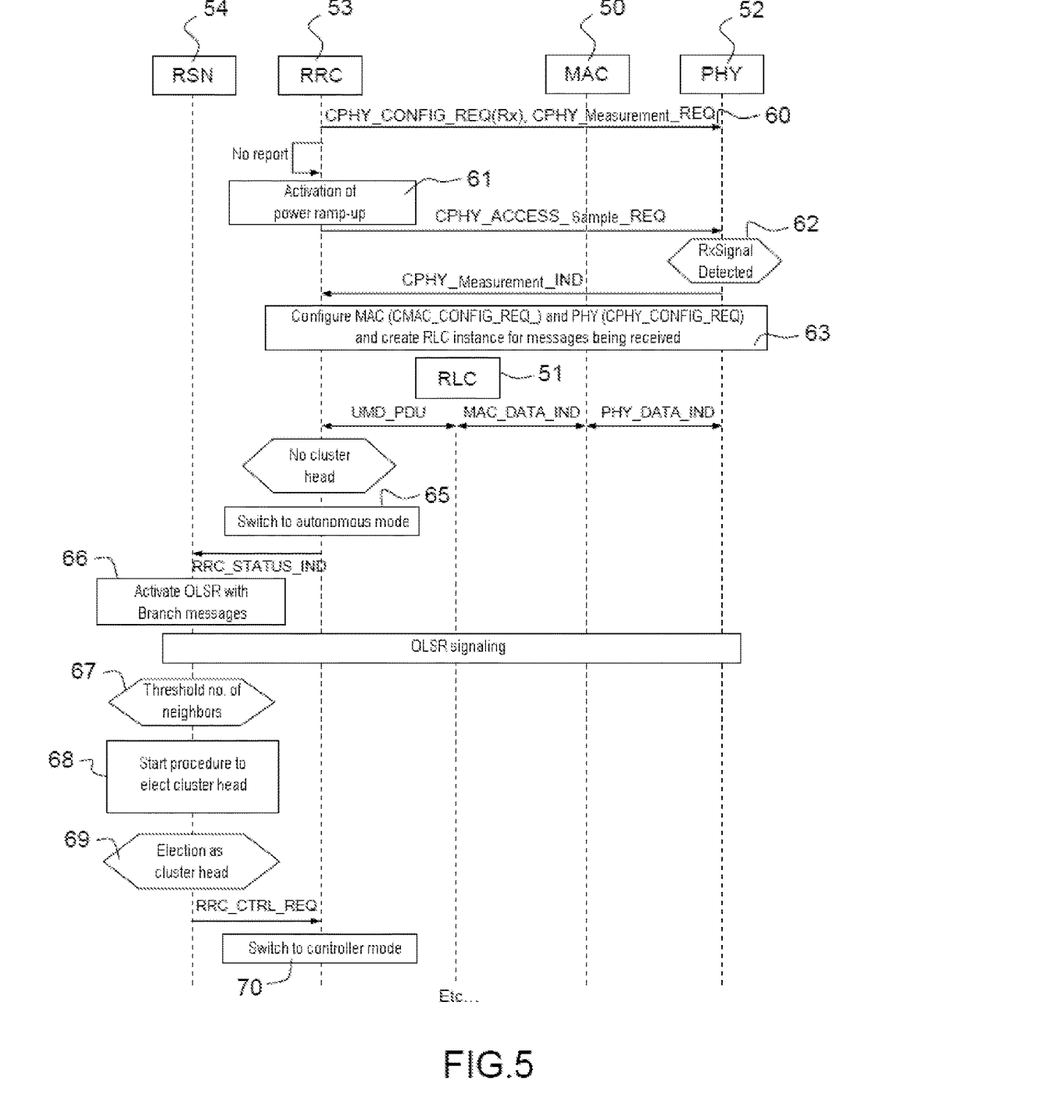

When a node is switched on, it initially has the role of basic member node, RRC, 53, is in autonomous mode and activates 60 the layer PHY for detecting neighbors. The layer PHY is configured by RRC to report to it measurements associated with the detection of a signal above a given threshold. If nothing is detected, this means that potential neighboring nodes are transmitting at too low a power level. Then RRC activates the sending of a signal 61 with a gradual power-up (probing procedure). The fact that the transmission is performed with a signal ramp must be seen as an alert for potential neighboring nodes, meaning that a participant or third-party is trying to reach them. Thus they can also increase their power-up in such a way that they can be heard.

When a neighboring signal is detected 62, RRC configures 63 and activates PHY 52, MAC 50 and RLC 51 for message reception and decoding.

Figure 6:
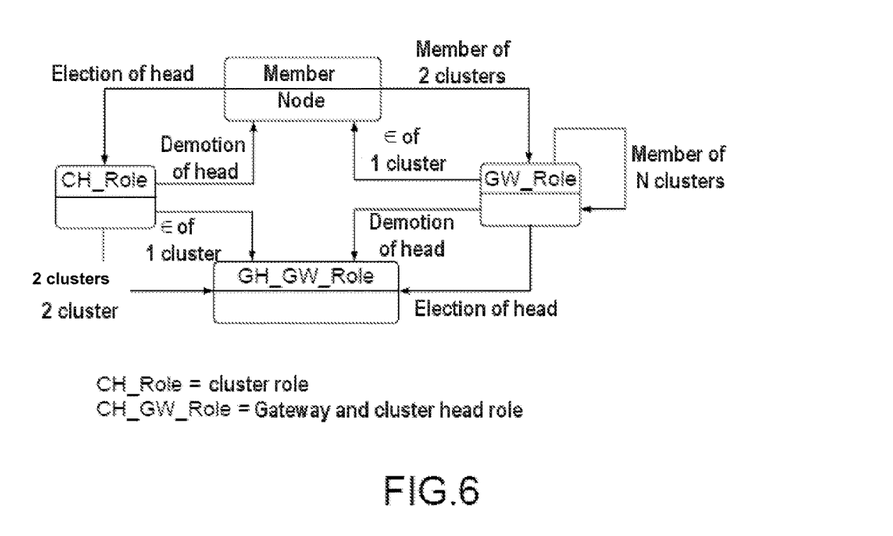

A marker in the received messages indicates the role of the transmitter. If the transmitter is a cluster head, the RRC instance of the affiliated node switches into a slave mode. Otherwise, it remains in autonomous mode 65. RRC indicates its status to RSN, 54. The latter case is represented in FIG. 6.

RSN activates the OLSR protocol 66 and configures its algorithm in flat non-hierarchized mode. Thus neighbor discovery is activated. Hello messages are forwarded from PHY to RSN via MAC and RLC in the user plane while measurements are reported from lower layers to RRC in the control plane. Additional messages, better known by the expression "branch messages", are added to the control messages according to methods known to the person skilled in the art.

When a "threshold number of neighbors" is reached 67 (the threshold has for example been configured by OAM in the management plane, and the threshold has established a minimum cluster size), this means that a procedure 68 for creating a cluster and electing the cluster head should be started by RSN. If the node is elected, 69, then the RRC instance is placed in a control state 70 and thus is reconfigured with the suitable algorithm and protocol. Otherwise, the RRC instance is in slave mode and is reconfigured to process protocol messages for resource requests, allocation receipt and execution.

In both cases, a power control procedure is started at RRC level in order to limit the Tx power i.e. to limit the coverage to a threshold="maximum number of neighbors"; this maximum threshold has been configured by OAM in the management plane and has been established for the maximum cluster or group size.

The OLSR process for keeping the knowledge of its neighbors up-to-date is carried out continuously. PHY continues to report measurements to RRC for newly detected signals.

For TDMA and/or OFDMA type accesses, adjacent clusters can either implement frequency sharing (with radio resource coordination) if the traffic is limited or, more often, implement a frequency reuse pattern of at least three frequencies (then the receiver implements multi-carrier polling or scanning).

In both cases, when a node detects that several messages contain a flag indicating that the transmitters are cluster heads, this means that the node is in range or under the coverage of at least two clusters and thus is a candidate to become a gateway node between these clusters. Thus, the RSN reconfiguration algorithm should operate in accordance with the OLSR MPR selection algorithm.

Transition toward hierarchical routing, i.e. toward the centralization of traffic flows to specific nodes, can be achieved in the same manner with the limitation that only authorized nodes can take on this role, for example ATH or NLI nodes. The return to non-hierarchical clustering modes is carried out according to a dedicated method.

In order to control the dynamics of clusters, a node with a high mobility (aeronautical, for example) can be prevented from being able to take on the role of cluster head CH or gateway GW. This node cannot be an MPR or OLSR. This prohibition is managed by the RSN protocol layer via a protocol marker which indicates the nature of the node, for example a vehicle, a portable terminal, a slow or fast aeronautical vehicle, ATH (At The Halt), NLI (Naval and Land Interworking). A slow moving aeronautical node such as a drone, due to conditions of propagation of its radio links with ground-based terminals, is automatically selected as an MPR by OLSR, unless this node must be configured by the network administration function OAM as being ineligible due to operational constraints. As such, it becomes a natural candidate to the role of gateway GW between the areas.

Management of Multiple Access Schemes

The protocol stack according to the invention enables several access schemes to be activated depending on the operational scenario in place. An example will be elaborated upon: consider that mobile equipment is limited from the point of view of power consumption, antenna gain and data rate. On the other hand, ATH and NLI equipment defined above can benefit from higher antenna gain and support expanded communication capacities.

Figure 7:
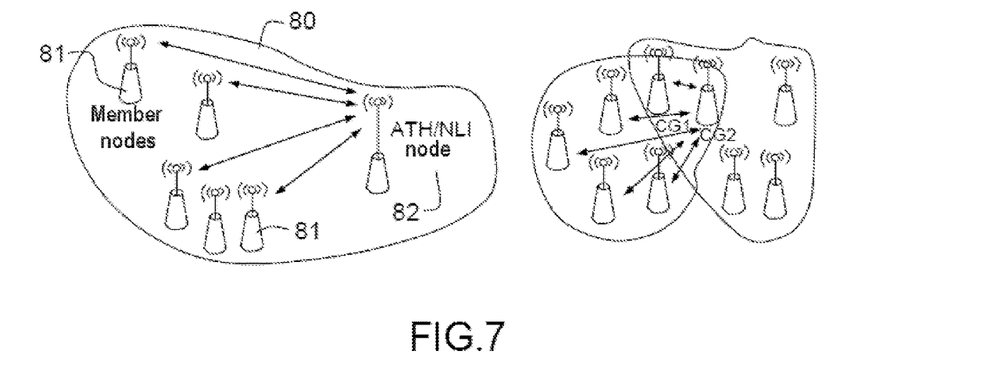

A typical example of an access scheme represented in FIG. 7 is as follows:

mobile equipment items 81 transmit with hybrid TDMA/FDMA single-carrier modulation under low coverage conditions. An isolated and far-away mobile equipment item makes use of spreading to communicate with a cluster gateway, i.e. DS-CDMA is applied above the TDMA/SC-(O)FDMA access scheme.

ATH/NLI equipment items 82 communicate simultaneously with several mobile equipment items. For a given TDMA time slot, these equipment items are capable of receiving several FDMA carriers which have been synchronized on the mobile transmitter side in such a way that they are orthogonal at the ATH/NLI receiver (from an ATH/NLI radio equipment point of view, the received signal is like a TDMA/OFDMA signal). Similarly, the ATH/NLI transmitter is run in a TDMA/OFDMA scheme towards each of the TDMA/SC-(O)FDMA mobile receivers.

In the mobile equipment items, RRC implements algorithms for radio resource management in the TDMA/SC-(O)FDMA modes. When a mobile equipment item switches to ATH mode, the node switches to cluster head mode and cluster gateway mode and RRC is reconfigured to activate the multi-carrier resource algorithm. In the downlink direction, from the ATH cluster head node to the mobile member nodes, RRC implements OFDMA modulation by allocation of one sub-carrier or one group of sub-carriers to OTM member nodes. In the uplink direction, the cluster head collects all the single-carrier signals from mobile member nodes and combines them as an OFDMA signal; from the point of view of the member node transmitters, the signal is SC-OFDMA while the receiver of the ATH cluster head node has a view over the sub-carriers, i.e. OFDMA.

RRC makes use of the primitives CPHY_CONFIG_REQ and MAC_CONFIG_REQ of the cross-layer control plane in order to reconfigure MAC and PHY. Certain equipment does not switch from one mode to another (for example, naval equipment), thus their RRC entity is configured at initialization (switch-on) unlike a mobile terminal equipped with a gain antenna mounted on a mast which can switch from mobile mode to ATH mode and vice versa, and for which the architecture according to the invention provides for a dynamic reconfiguration.

Management of MIMO Multiple Input Multiple Output

The architecture according to the invention is compatible with the implementation of the multiple input multiple output, or MIMO, method for individual radio links as well as for multi-user cooperative multi-links, MU-MIMO.

Due to precise synchronization and power control constraints, MIMO can be reserved for the following scenarios:
when the cluster head is stable and plays the role of traffic concentrator, as cluster gateway, i.e. ATH and/or NLI scenario,
in high density areas, to unburden cluster gateways by load balancing.

The practical example illustrated in FIG. 7 concerns portable mobile terminals 81 with a simple antenna while the ATH/NLI nodes 82 can be equipped with antenna networks, said equipment forming for example part of the same area 80 or cluster.

Each cluster head RRC entity is configured with a multi-user MIMO decision algorithm. It periodically receives quality measurements from lower layers and also measurement reports from member nodes. This centralized RRC entity supervises power control of member nodes and thus has a knowledge of the power actually transmitted by the member nodes. When it detects a degradation in the received quality and a loss of power from the member nodes, it can decide to activate the multi-user MIMO, or MU-MIMO, function, i.e. placing in an order a set of member nodes to transmit an information flow over the radio resource. At the cluster head, there is coordination between RSN and RRC for this transmission configuration. The RRC cluster head configures its RLC, MAC and PHY layers and transmits RRC signaling messages to member nodes that are involved, including the time for switching to cooperative transmission.

Diverse Applications

The architecture according to the invention notably finds its application in the domains listed below.

On The Move: the network is a multi-hop mobile ad hoc network. It manages a self-organization of communication terminal equipment including high data rate services, such as mobile phones, etc.

At The Halt: the architecture can be used with fixed or semi-fixed terminals which act as a backbone so as to interface with logistical infrastructure, or other on-the-move networks. This can be accomplished, for example, with a mobile terminal equipped with a gain antenna mounted on a mast; the waveform of the terminal is then configured to support the extended communication capacity associated with services (higher data rate, extended coverage).

Naval/maritime and Land Interworking: the architecture according to the invention is suitable for managing communications between "maritime" terminals (boat mounted equipment) and land terminals.

The radio architecture according to the invention notably exhibits the following advantages:

- it defines functional assemblies that are as independent as possible from one another,
- it is structured in layers and modules,
- it supports interfaces and APIs that are compatible with several waveforms (legacy, future, etc),
- it organizes cross-layer optimizations in a structured framework and limits cross-layer exchanges,
- it is "open" and proposes standardizable interfaces,
- it provides for interoperability between equipment from multiple suppliers,
- it provides for the gradual integration of new technologies at both the lower and upper layers,
- it supports Quality of Service optimization by cross-layering,
- it supports an adaptive transmission mode (dynamic and online reconfiguration depending on the conditions of transmission),
- it supports several radio channels,
- it is compatible with various access types,
- it integrates the ad hoc aspect (routing, self-configuration, etc) in flat mode, as in clusterized and hierarchized mode,
- it supports a secure, local or remote, management and supervision mode,
- it can be used for various ranges of terrestrial, aeronautical or naval products,
- it takes into account high security requirements,
- it is integrated in a software radio environment,
- it provides for simultaneously sharing the specifications and development between products and product ranges, and the know-how of the art.

The invention claimed is:

1. An ad hoc type network comprising:
    one or more modules from third generation 3GPP network architectures, and
    a protocol stack including:
        a radio access plane,
        a control plane including:
            at least one node configured to implement mobility management,
            a physical (PHY) layer and a medium access control (MAC) layer of the protocol stack configured by the at least one node to implement a radio resource control, and
            the at least one node configured to implement a radio routing between the mobility management implemented by the at least one node and the radio resource control implemented by the at least one node, wherein the radio routing implemented by the at least one node and the radio resource implemented by the at least one node being dynamically configured to activate or inhibit algorithms in the ad hoc network when nodes of the ad hoc network switch from a role from among a cluster head, a gateway node, and an ordinary member node,
        said ad hoc type network configured by implementation of the nodes to allow an organization of radio resources into several groups or clusters, a group or a cluster corresponding to a grouping together of the radio resources for a given coverage area of the ad hoc network,
        wherein a part of the mobility management implemented by the at least one node is configured in the control plane to manage transfers, or handovers, between the groups, said ad hoc network being clusterized when said groups or clusters of the ad hoc network are present, and
        the radio resource control implemented by the at least one node being configured to manage handover decisions and radio resource management,
        said protocol stack implemented by the at least one node further comprising a layer configured to process a radio-level regenerative relaying at a level of a data packet, and
        a security plane implemented by the at least one node configured to isolate functions for the protocol stack,
    wherein said mobility management implemented by the at least one node, said radio routing implemented by the at least one node, and the radio resource control implemented by the at least one node of said protocol stack are combined to centralize cross-layer optimization processing actions by limiting a volume of exchanges of cross-layer information, said combining being interfaced by the control plane to all other layers and functions of a waveform used in the ad hoc network.

2. The ad hoc type network as claimed in claim 1, wherein the protocol stack further comprises a remote supervision unit.

3. The ad hoc type network as claimed in claim 1, wherein the protocol stack further comprises a local supervision unit, at each node of the ad hoc network.

4. The ad hoc type network as claimed in claim 1, wherein the protocol stack comprises the radio resource control implemented by the at least one node including a slow processor, and a medium access control unit suitable for sequencing access to the physical medium in a real-time manner and for carrying out fast adaptations of transmission format among a set of formats supplied by the radio resource management implemented by the at least one node, on a frame by frame basis and in accordance with fluctuations including source flow variations, discontinuous transmission configuration and variations in radio routes.

5. The ad hoc type network as claimed in claim 1, wherein said protocol stack is further configured to implement a dynamic reconfiguration for algorithms and protocols of the radio routing implemented by the at least one node and radio resource management implemented by the at least one node.

6. The ad hoc type network as claimed in claim 1, wherein said protocol stack is further configured to implement a reconfiguring of radio resource management algorithms and a reconfiguring of the medium access control and physical layers.

7. The ad hoc type network as claimed in claim 1, wherein the radio routing implemented by the at least one node is dynamically configurable based upon a dynamic transition between a flat mode and a cluster mode of the ad hoc network, said flat mode representing a non-hierarchical ad hoc network.

* * * * *